UNITED STATES PATENT OFFICE.

CHARLES H. WATERS, OF GROTON, ASSIGNOR TO THE CLINTON WIRE CLOTH COMPANY, OF CLINTON, MASSACHUSETTS.

IMPROVEMENT IN MACHINE-PAINTED WIRE-CLOTH.

Specification forming part of Letters Patent No. 84,520, dated December 1, 1868; Reissue No. 4,463, dated July 4, 1871; Reissue No. 6,626, dated August 31, 1875; Reissue No. 8,023, dated January 1, 1878; application filed December 6, 1877.

DIVISION B.

*To all whom it may concern:*

Be it known that I, CHARLES H. WATERS, of Groton, in the county of Middlesex and State of Massachusetts, have invented a new and useful Manufacture of Machine-Painted Wire-Cloth, of which the following is a specification:

Heretofore the painting of wire-cloth has been done by hand. The production of the article has consequently been slow, expensive, and when completed there was a want of uniformity in distribution of color and in its appearance, which detracted seriously from its commercial value.

To carry out the object of my invention, I make use of mechanism (which may be driven by any suitable well-known power) by which I am enabled to produce an article of painted wire-cloth rapidly, economically, and presenting a thoroughly-coated uniform appearance, which, by the even disposition of the paint and absence from *striæ* and other features, enables it readily to be distinguished in the market from the hand-made article.

I first coat the cloth thoroughly with paint, and then remove the surplus by squeezing it between surfaces.

A form of apparatus for producing my improved article is described in reissued Letters Patent No. 6,625, granted to me August 31, 1875, being a division of the original patent on which this present application is based.

I do not, however, limit myself to the employment of the specific apparatus or machinery therein shown and described, as the article may be produced in various equivalent ways.

As, so far as my knowledge extends, I was the first ever to produce such an article by machinery driven by power,

I claim—

As an improved article of manufacture, machine-painted wire-cloth possessing the characteristics hereinbefore set forth.

CHARLES H. WATERS.

Witnesses:

H. H. WATERS,

J. HENRY TAYLOR.